(12) United States Patent
Goncalves

(10) Patent No.: US 10,609,339 B2
(45) Date of Patent: Mar. 31, 2020

(54) SYSTEM FOR AND METHOD OF DYNAMICALLY DISPLAYING IMAGES ON A VEHICLE ELECTRONIC DISPLAY

(71) Applicant: GM GLOBAL TECHNOLOGY OPERATIONS LLC, Detroit, MI (US)

(72) Inventor: Luis M. Goncalves, Farmington Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 278 days.

(21) Appl. No.: 15/466,604

(22) Filed: Mar. 22, 2017

(65) Prior Publication Data

US 2018/0272944 A1    Sep. 27, 2018

(51) Int. Cl.
| | |
|---|---|
| *B60R 1/00* | (2006.01) |
| *G06T 11/60* | (2006.01) |
| *H04N 7/18* | (2006.01) |
| *H04N 5/272* | (2006.01) |
| *H04N 5/247* | (2006.01) |
| *G06K 9/00* | (2006.01) |

(52) U.S. Cl.
CPC ............... *H04N 7/181* (2013.01); *B60R 1/00* (2013.01); *G06T 11/60* (2013.01); *H04N 5/247* (2013.01); *H04N 5/272* (2013.01); *B60K 2370/152* (2019.05); *B60K 2370/21* (2019.05); *B60K 2370/52* (2019.05); *B60K 2370/777* (2019.05); *B60R 2300/304* (2013.01); *B60R 2300/8006* (2013.01); *B60R 2300/8033* (2013.01); *B60R 2300/8046* (2013.01); *G06K 9/00805* (2013.01)

(58) Field of Classification Search
CPC ................................. B60R 1/003; G06T 11/60
USPC .......................................................... 348/148
See application file for complete search history.

(56) References Cited

U.S. PATENT DOCUMENTS

| | | | |
|---|---|---|---|
| 10,029,621 B2 | 7/2018 | Vojtisek et al. | |
| 2016/0368418 A1 | 12/2016 | Suenaga et al. | |
| 2017/0280091 A1* | 9/2017 | Greenwood | ............. B60R 1/00 |
| 2017/0347067 A1 | 11/2017 | Bostrom et al. | |
| 2017/0374287 A1 | 12/2017 | Lang | |
| 2018/0220082 A1* | 8/2018 | Lewis | .................... H04N 5/272 |

FOREIGN PATENT DOCUMENTS

DE         202014102291 U1      8/2014

OTHER PUBLICATIONS

Office action issued by the German Patent and Trademark Office for application No. 102018105951.5.

* cited by examiner

*Primary Examiner* — Jeffery A Williams
(74) *Attorney, Agent, or Firm* — Reising Ethington, P.C.

(57) ABSTRACT

A system for and method of displaying multiple images on an electronic display included in a vehicle. The method may include altering the position or one or more properties of a secondary image based on whether an object is detected in a primary image. The electronic display can be an electronic display mirror providing a view of an area behind the vehicle as the primary image.

10 Claims, 3 Drawing Sheets

SYSTEM FOR AND METHOD OF DYNAMICALLY DISPLAYING IMAGES ON A VEHICLE ELECTRONIC DISPLAY

INTRODUCTION

The technical field relates to displaying images on electronic displays included in a vehicle and positioning or altering the images based on sensor or other data received or obtained at the vehicle.

Vehicles include numerous electronic components, such as electronic displays. Some vehicles now include electronic display mirrors that display images obtained from a camera or light sensor and that imitate or function as traditional rearview or side-view vehicle mirrors. These electronic display mirrors can include the ability to display various images, such as images from an area surrounding the vehicle and images automatically generated by the vehicle. Thus, certain vehicle electronic displays can display additional images along with a primary image (such as a video of the area behind the vehicle) and, in some scenarios, these additional secondary images may obscure view of an object in the primary image.

SUMMARY

According to one embodiment, there is provided a method of displaying images on an electronic display included in a vehicle, the method including: generating a primary image to display on the electronic display that is included in the vehicle; receiving sensor signals from one or more sensors located on or at the vehicle; generating a secondary image to display on the electronic display; and displaying the primary image on the electronic display and the secondary image on the electronic display, wherein the secondary image is overlaid on the primary image in a position at least partially based on the received sensor signals.

According to another embodiment, there is provided a method of displaying images on an electronic display included in a vehicle, the method comprising: displaying a primary image on the electronic display that is included in the vehicle; monitoring a vehicle status parameter using one or more sensors included on or at the vehicle; based on the monitored vehicle status parameter, determining whether to display a secondary image on the electronic display; and when it is determined to display the secondary image on the electronic display, then: determining an area on the electronic display to display the secondary image; and displaying the secondary image at the determined area on the electronic display.

According to yet another embodiment, there is provided a system for displaying images in a vehicle. The system comprises one or more sensors located on or at the vehicle, a rear-facing camera configured to generate a primary image, a second camera configured to generate a secondary image, an electronic display mirror configured to display the primary image from the rear-facing camera and the secondary image from the second camera, and a control unit connected to the one or more sensors, the rear-facing camera, the second camera, and the electronic display mirror, wherein the control unit is configured to receive sensor signals from the one or more sensors located on or at the vehicle and display the primary image on the electronic display mirror and the secondary image on the electronic display mirror, wherein the secondary image is overlaid on the primary image in a position at least partially based on the received sensor signals.

BRIEF DESCRIPTION OF THE DRAWINGS

Preferred exemplary embodiments will hereinafter be described in conjunction with the appended drawings, wherein like designations denote like elements, and wherein.

DETAILED DESCRIPTION OF THE ILLUSTRATED EMBODIMENTS

The systems and methods described below enable a vehicle to display multiple images on an electronic display included in a vehicle. The electronic display may be used to display images for viewing by a vehicle operator. The images may be received from a control unit and/or other vehicle system modules via a communications bus. In some embodiments, the electronic display may be an electronic display mirror mounted in a vehicle and may display images received from a rearview video camera mounted on the vehicle and facing an area behind the vehicle. The control unit may be used to generate a primary image and one or more secondary images to be displayed on the electronic display. The control unit may also receive sensor signals and/or may monitor a vehicle status parameter (e.g., position of an external object), which is defined below. Based on the received sensor signals and/or the monitored vehicle status parameter, the control unit may determine whether to display certain images (e.g., the primary or secondary images) on the electronic display. Additionally, the positioning of the images, as well as other display characteristics (e.g., degree of transparency, size), may be determined based on the received sensor signals and/or the monitored vehicle status parameter. In some embodiments, the secondary image(s) may be overlaid on the primary image and these secondary image(s) may be positioned and/or altered so as to reduce interference with objects (such as another vehicle) displayed in the primary images.

Figure 1:
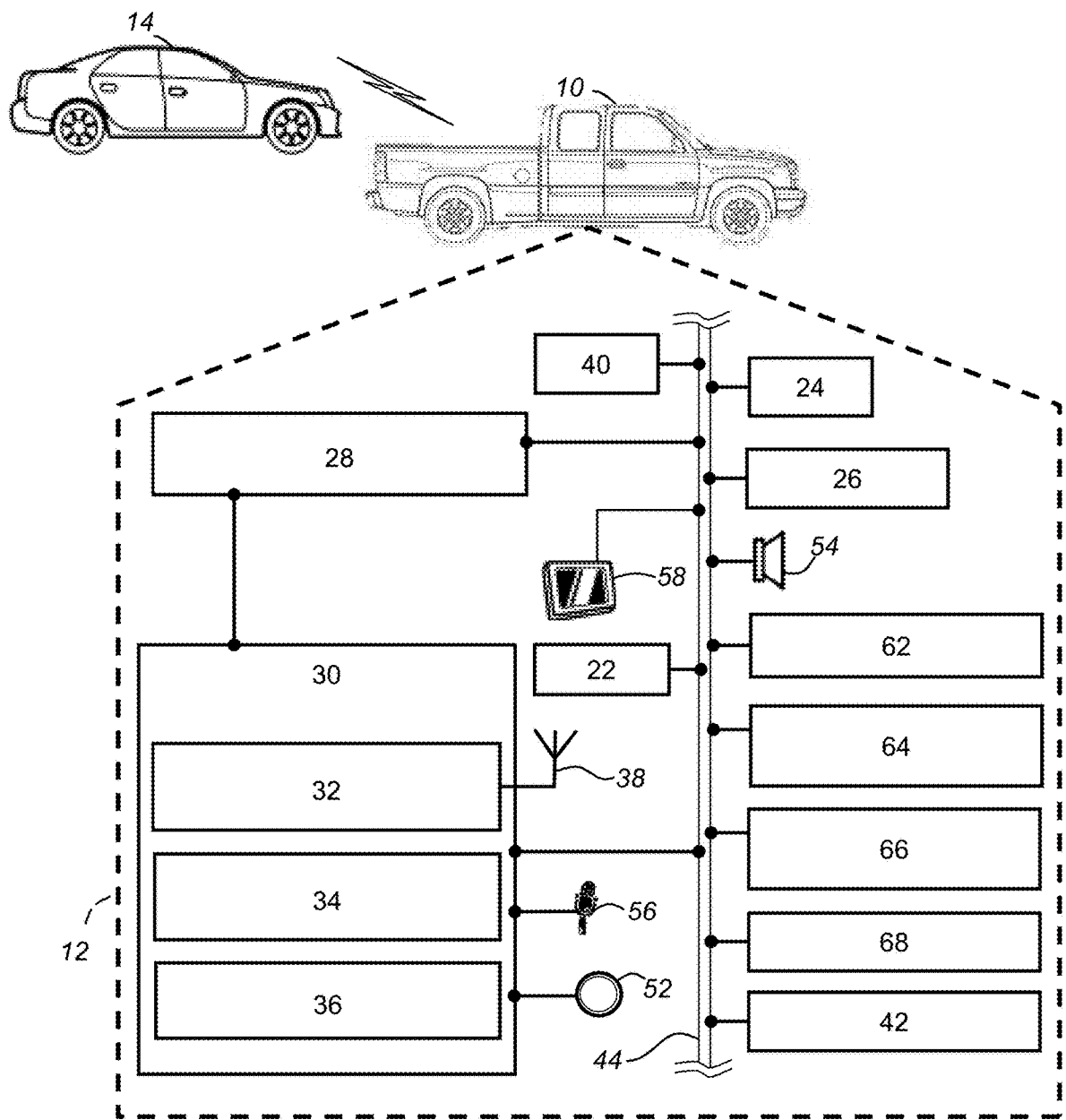
FIG. 1 is a block diagram depicting an embodiment of a system that is capable of utilizing the method disclosed herein.

Referring now to FIG. 1, there is shown a vehicle 12 with a vehicle electronics system 12 that can be used to implement the method disclosed herein. The vehicle electronics system 12 generally includes an electronic display in the form of electronic display mirror 28 and a control unit 30. It should be understood that the disclosed method can be used with any number of different systems and is not specifically limited to the operating environment shown here. Also, the architecture, construction, setup, and operation of the system 12 and its individual components are generally known in the art. Thus, the following paragraphs simply provide a brief overview of one such vehicle electronics system 12; however, other systems not shown here could employ the disclosed method as well.

Vehicle 10 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 20 are shown generally in FIG. 1 and includes the electronic display mirror 28, the control unit 30, a body control module (BCM) 40, a GPS module 22, vehicle-to-vehicle (V2V) unit 24, sensors 26, other VSMs 42, vehicle-user interfaces 52-58, cameras 62-68, and numerous other components and devices. Some or all of the different vehicle electronics may be connected for communication with each other via one or more communication busses, such as bus 44, although any operable connection system or type may be used.

The vehicle 12 can include numerous vehicle system modules (VSMs) as part of vehicle electronics system 12, such as the GPS module 22, an engine control unit (ECU) (not shown), sensors 26, electronic display mirror 28, control unit 30, body control module (BCM) 40, vehicle user interfaces 52-58, and cameras 62-68, as will be described in detail below. The vehicle 12 can also include other VSMs 42 in the form of electronic hardware components that are located throughout the vehicle and, which may receive input from one or more sensors and use the sensed input to perform diagnostic, monitoring, control, reporting, and/or other functions. For example, other VSMs may include a telematics unit, a center stack module (CSM), an infotainment unit, a powertrain control module, or a transmission control unit. Each of the VSMs 42 may be connected by communications bus 44 to the other VSMs, as well as to the control unit 30 (directly and/or via bus 44), and can be programmed to run vehicle system and subsystem diagnostic tests. As is appreciated by those skilled in the art, the above-mentioned VSMs are only examples of some of the modules that may be used in vehicle 12, as numerous others are also possible.

Global position system (GPS) module 22 receives radio signals from a constellation of GPS satellites (not shown). GPS module 22 can provide this location data to control unit 30, which can then use this data to identify known locations, such as a vehicle operator's home or workplace. Additionally, GPS module 22 may be used to provide navigation and other position-related services to the vehicle operator. Navigation information can be presented on the electronic display mirror 28 and/or display 58 (or other display within the vehicle) in the form of a primary or secondary image including one or more graphics or the like. Or, the navigation information can be presented verbally such as is done when supplying turn-by-turn navigation. The navigation services can be provided using a dedicated in-vehicle navigation module (which can be part of GPS module 22), or some or all navigation services can be done via a telematics unit installed in the vehicle, wherein the position information is sent to a remote location for purposes of providing the vehicle with navigation maps, map annotations (points of interest, restaurants, etc.), route calculations, and the like. The GPS module 22 may be used as a sensor to provide input relating to nearby objects or vehicles for use with the methods described herein.

Vehicle-to-vehicle (V2V) unit 24 is a wireless communication device that enables host vehicle 12 to communicate with one or more similarly equipped and nearby vehicles according to a V2V communication system, such as a V2V communication connection between two V2V-enabled vehicles. The V2V unit 24 may be used as a sensor to provide input relating to nearby objects or vehicles, such as vehicle 14, for use with the methods described herein.

Vehicle sensors 26 provide the vehicle with sensor input that includes various sensor readings, measurements, and/or other information that may be useful for carrying out the present method. For example, vehicle sensors 26 may include sensors or other components for measuring: presence of object 14 around in a blind-spot of the vehicle, absolute speed of the vehicle, position of object 14 with respect to the vehicle, speed of object 14 with respect to the vehicle, absolute speed of object 14, wheel speed of the vehicle, wheel acceleration of the vehicle, vehicle speed, vehicle acceleration (longitudinal and/or lateral acceleration), yaw rate of the vehicle, steering wheel angle of the vehicle, other vehicle dynamics, as well as other sensors known in the art but not mentioned here. Sensors 26 can utilize a variety of different sensor types and techniques, including RADAR devices, laser devices, LIDAR devices, ultrasound devices, vision devices (e.g., camera, etc.), devices for receiving communications from roadside beacons or sensors, other known devices or combinations thereof, further including devices that use rotational wheel speed, ground speed, an accelerometer, an inertial measurement unit (IMU), accelerator pedal position, gear shifter selection, engine speed, engine output, throttle valve position, steering wheel angle, to name a few. Skilled artisans will appreciate that these sensors may operate according to optical, electromagnetic, and/or other technologies, and that other parameters may be derived or calculated from these readings (e.g., acceleration may be calculated from velocity). Sensors 26 may be embodied in hardware, software, firmware, or some combination thereof, and these sensors may directly sense or measure the conditions for which they are provided, or they may indirectly evaluate such conditions based on information provided by other sensors, components, devices, modules, systems, etc. It is possible for any of the various sensor readings described below to be provided by some other component, device, module, system, etc. in host vehicle 12 instead of being provided by an actual sensor element. It should be appreciated that the foregoing scenarios represent only some of the possibilities, as the present system and method are not limited to any particular sensor or sensor arrangement.

Electronic display mirror 28 is an electronic display and includes a video display integrated into the rear view mirror unit or housing so that the display shows the driver the video output from the rear view camera 62 in real time, as well as other graphics or images (e.g., images from cameras 64-68). As used herein, an electronic display may be any display that can present images, video, graphics, etc., based on electronic signals that are received. It should be understood that, as used herein, "images" may include still images, real-time or recorded video, graphics, or the like. According to the exemplary embodiment of FIG. 1, the electronic display mirror 28 is coupled to and receives enhanced video output from control unit 30. The electronic display mirror may utilize any number of different display technologies, such as a liquid crystal display (LCD) or a light emitting diode (LED) display. It should be appreciated that the system and method described herein may use any suitable type of electronic display mirror 28 and are not limited to any particular one. For instance, the electronic display mirror 28 may be a full display mirror (FDM) where the entire viewable surface of the device shows video from one of the cameras 62-68; it may be the type of electronic display mirror where only a portion of the display surface shows video from one of the cameras 62-68, whereas other portions of the display surface show other information (e.g., turn-by-turn or other navigation instructions, a compass or heading information, host vehicle performance data, etc.); it could have daytime and nighttime modes that adjust the brightness accordingly; or it could have a touchscreen so that users can make selections or otherwise input data, to cite a few of the possibilities. Instead of the electronic display mirror 28 being positioned in the traditional location of a rear-view mirror (i.e., mounted to the front windshield at an upper, center location), it is possible for it to be part of a center console infotainment or rear backup display or for it to be part of some other display. The systems and methods described herein are particularly applicable for electronic display mirrors, as the size of the mirror is typically smaller than other vehicle display units. Further, since electronic display mirrors can provide highly useful information to the driver with regard to the vehicle surroundings, the systems and methods herein can allow for efficient and advantageous presentation of such information.

The electronic display mirror 28 may be used to view one or more objects behind the vehicle, such as target object 14. Object 14 is depicted in the illustrated embodiment as a passenger car, but it should be appreciated that object 14 may be any other identifiable object, such as a pedestrian, a building, or a traffic cone. In an embodiment where object 14 is another vehicle, this other vehicle 14 may communicate with vehicle 12 via V2V communications or other communications (e.g., cellular, SRWC). Additionally, there may be more than one object 14.

Control unit 30 can be at least partially responsible for performing or carrying out one or more of the methods described below. In a preferred embodiment, control unit 30 may be a video control unit dedicated to receiving and processing input from one or more vehicle cameras such as cameras 62-68 and providing output to one or more vehicle devices, such as the electronic display mirror 28. Alternatively, the control unit 30 may be part of or used by one or more other vehicle systems, such as an active safety system, to cite one example. As shown in the exemplary embodiment of FIG. 1, control unit 30 includes a wireless access point (WAP) 32, a processor 34, memory 36, and one or more antennas 38 (only one is shown). In other embodiments, control unit 30 may not include a wireless access point, but may instead include a modem, an Ethernet port, or other hardware that can be used for wired communications over communications bus 44. According to an exemplary embodiment, the control unit 30 is connected to cameras 62-68 and receives video input, is connected to V2V unit 24 and receives traffic input, is connected to vehicle sensors 26 and receives sensor input, is connected to GPS module 22 and receives navigation input, and is connected to electronic display mirror 28 and provides video output, although other combinations of devices may be connected to the control unit instead. Any one of these connections may be made via communications bus 44, via WAP 32, and/or via any other operable direct or indirect connection method. Control unit 30 may include any variety of electronic processing devices, memory devices, input/output (I/O) devices, and/or other known components, and may perform various control and/or communication related functions.

In an exemplary embodiment, control unit 30 includes an electronic memory device 36 that may receive and store any combination of the following items: image or video data from cameras 62-68, information pertaining to nearby vehicles from V2V unit 24, sensor readings from vehicle sensors 26, position or heading data from GPS module 22, look up tables or other data structures, algorithms (e.g., algorithms embodied in the exemplary method described below), etc. Memory device 36 may also store pertinent characteristics and background information pertaining to the host vehicle 12, such as information relating to vehicle dimensions (e.g., weight, width and length), stopping distances, driver behavioral or historical data, particular sensor or camera locations and orientations on host vehicle 12, etc. Control unit 30 may also include an electronic processing device 34 (e.g., a microprocessor, a microcontroller, an application specific integrated circuit (ASIC), etc.) that executes instructions for software, firmware, programs, algorithms, scripts, applications, etc. that are stored in memory device 36 and may govern the methods described herein. Control unit 30 may be electronically connected to other vehicle devices, modules, and systems via suitable vehicle communications (e.g., a CAN bus or the like) and can interact with them when required. These are, of course, only some of the possible arrangements, functions and capabilities of control unit 30, as other embodiments could also be used.

In some embodiments, control unit 30 is capable of communicating data via short range wireless communications (SRWC). In many embodiments, the control unit 30 may be specifically configured to carry out the method disclosed herein. In one embodiment, control unit 30 may be a standalone module or, in other embodiments, device 30 may be incorporated or included as a part of one or more other vehicle system modules, such as a center stack module (CSM), body control module, an infotainment module, a telematics module, a head unit, and/or a gateway module. In some embodiments, the control unit 30 can be implemented as an OEM-installed (embedded) or aftermarket device that is installed in the vehicle.

Control unit 30 may be connected directly or indirectly to one or more cameras, such as cameras 62-68. Cameras 62-68 can be video cameras that are directed to a particular area within or around the vehicle 12 and provides the control unit 30 with video input to be displayed on the electronic display mirror 28. Cameras 62-68 may be of any suitable camera type (e.g., charge coupled device (CCD), complementary metal oxide semiconductor (CMOS), etc.) and may have any suitable lens known in the art so that it is not limited to any particular type, brand or model. In one embodiment, camera 62 may be a rearview camera that is positioned on the vehicle to face an area behind vehicle 12, camera 64 may be a left blind-spot camera that is positioned such that a blind-spot on the left side of vehicle 12, camera 66 may be a right blind-spot camera that is positioned such that a blind-spot on the right side of vehicle 122, and camera 68 may be an auxiliary camera that can be positioned at any desired location such as to face the rear bed of vehicle 122 in the illustrated example. In other embodiments, any one or more of cameras 62-68 may capture different areas in and/or surrounding vehicle 12, such as a backseat of the vehicle, a truck bed of the vehicle, a blind spot of the vehicle, an inside area of a trunk, or an inside area of a trailer. Cameras 62-68 may provide a plurality of images (e.g., derived from streaming video or other captured video) to control unit 30, which may then display these images on electronic display mirror 28 or other display in or at vehicle 12.

According to one embodiment, cameras 62-68, and more particularly, rear-facing camera 62, may provide video data where the images (e.g., images constituting the video data) are horizontally flipped (i.e., they are the mirror image of the video originally captured by the camera). The horizontally flipped video data accounts for the fact that cameras 62-68 and the driver are facing opposite directions thereby allowing presentation of the video data on the electronic display mirror 28 in an orientation that is consistent with traditional rear view and rear-facing side mirrors. Some non-limiting examples of potential embodiments or features that may be used with cameras 62-68 include: infrared LEDs for night vision; wide angle or fish eye lenses; surface mount, flush mount, license mount, or side mount cameras; stereoscopic arrangements with multiple cameras; cameras integrated into tail lights, brake lights, or other components at the rear end of the vehicle; and wired or wireless cameras, to cite a few possibilities.

Cameras 62-68 may send or transmit video or image data to control unit 30. For example, rear-facing camera 62 may continuously transmit video data to control unit 30 while the vehicle's ignition or primary propulsion system is on or activated. Additionally, blind-spot cameras 64 and 66 may transmit or send video data of the left and right blind spots to control unit 30. Auxiliary (or truck-bed) camera 68 may send video data to control unit 30 as well. The video data may be interlaced or progressive scan type video data or interlaced scan type video data to control unit 30. The control unit may then decode, convert, or otherwise process the video data such that the video encoded in the data may be properly displayed on electronic display mirror 28, visual display 58, or other display. For example, if the electronic display mirror were to be configured to display progressive scan type video and the video data received at the control unit were to be interlaced scan type video data, the interlaced scan type video data may be de-interlaced at the control unit such that the interlaced scan type video received from cameras 62-68 may be placed in the proper progressive scan type format so that the electronic display mirror 28 could properly display the video data. Other image processing may be carried out by processor 34 or other processing device in vehicle 12, much of which is well known by one skilled in the art.

As will be discussed more below, one or more images or other graphics may be displayed upon electronic display mirror and such images or graphics may be displayed based on certain sensor data or video/image data received from cameras 62-68. For example, through use of image processing techniques, the processor may recognize certain objects, such as an object or other vehicle 14 which may be located behind vehicle 12. In one embodiment, control unit 30 may use image processing software that may distinguish certain objects in the captured images and, through analysis of a series of images, possibly in combination with information from one or more vehicle sensors such as sensors 36, may determine a position, distance, velocity and/or acceleration of such distinguished objects with respect to vehicle 12. Or, the video feed may determine that certain objects, such as another vehicle 14, may be of interest to a vehicle operator and, thus, the video depicting these objects may be given priority to be displayed on electronic display mirror 28.

Any of the devices 22-68 may be stand-alone, as illustrated in FIG. 1, or they may be incorporated or included within some other device, unit or module (e.g., the V2V unit 24 could be included within another vehicle communication module, some of the sensors 26 could be packaged in an inertial measurement unit (IMU), the GPS module 22 could be part of a telematics unit, the control unit 30 could be integrated with the electronic display mirror 28 or an instrument cluster control module, etc.). Furthermore, any of the devices 22-68 may be dedicated, as depicted in FIG. 1, or they may be part of or shared by other systems or subsystems in the vehicle (e.g., cameras 62-68 and/or some of the sensors 26 could be part of an active safety system, an antilock brake system (ABS), or an autonomous or semi-autonomous driving system; the electronic display mirror 28 or the control unit 30 could be part of a vehicle infotainment system, etc.). The video input, traffic input, sensor input and/or navigation input from devices 22-68 may be directly provided to control unit 30 or indirectly provided through some other device, module and/or system, as is commonly known in the art. Similarly, the enhanced video output from control unit 30 may be directly or indirectly provided to the electronic display mirror 28. Accordingly, the devices 22-68 are not limited to the schematic representation in FIG. 1 or the exemplary descriptions above, nor are they limited to any particular embodiment or arrangement so long as they can be used with the method described herein.

Figure 2:
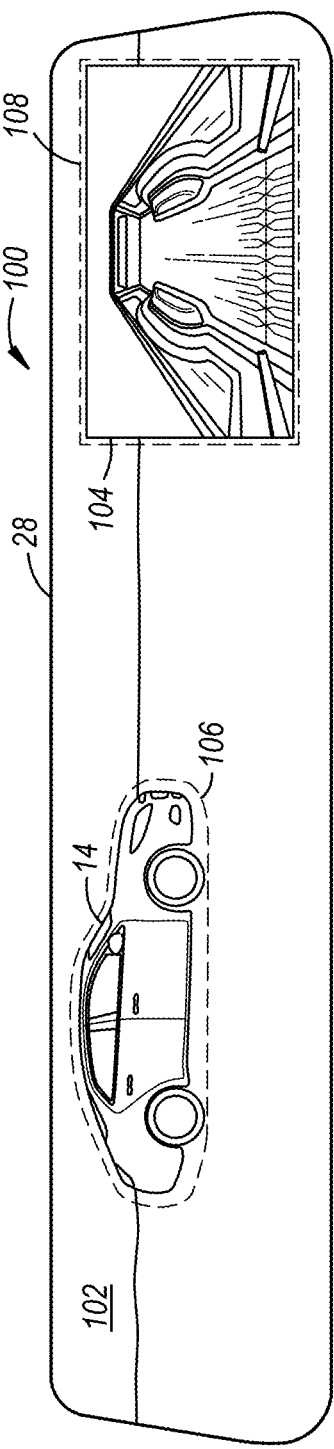
FIG. 2 is a schematic illustration of an exemplary electronic display mirror that may be used with the system of FIG. 1 during the occurrence of a first scenario.
Figure 3:
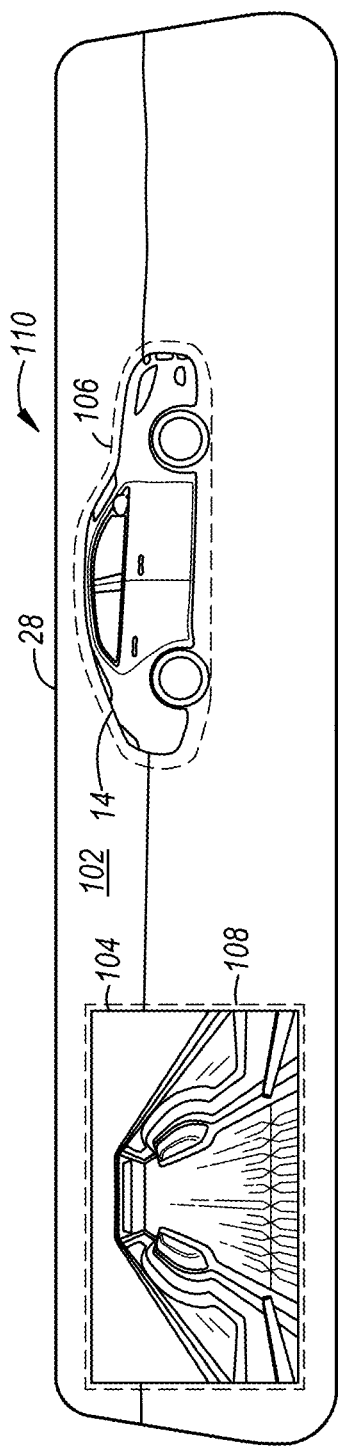
FIG. 3 is a schematic illustration of an exemplary electronic display mirror that may be used with the system of FIG. 1 during the occurrence of a second scenario.
Figure 4:
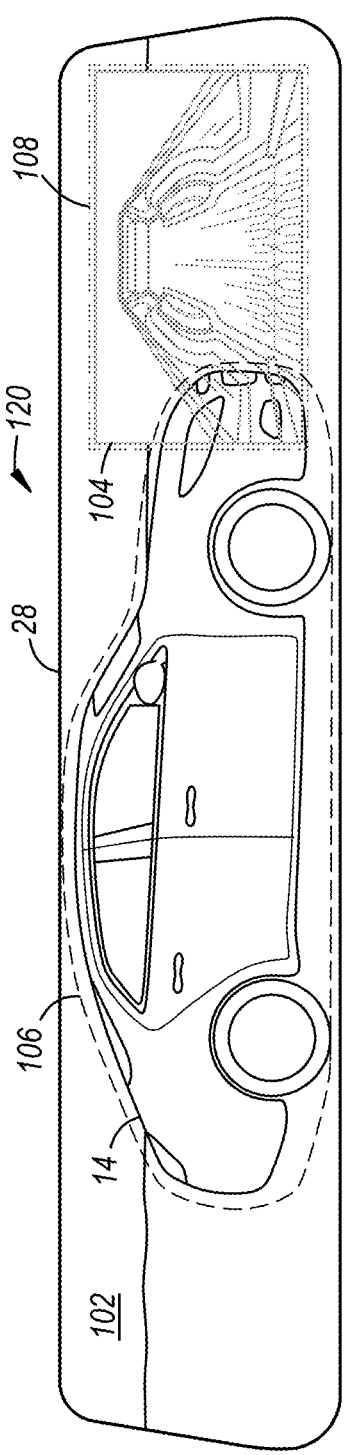
FIG. 4 is a schematic illustration of an exemplary electronic display mirror that may be used with the system of FIG. 1 during the occurrence of a third scenario.

With reference to FIGS. 2-4, there are shown three scenarios 100, 110, and 120. These scenarios show the electronic display mirror 28 with a primary image 102 and a secondary image 104, and illustrate different ways in which the method may integrate or position the images with respect to one another. The primary image 102 may include video data from a rearview camera 62 and the secondary image 104 may include video data from another image source, which, as shown, may be images or video of the vehicle's truck bed from auxiliary camera 68. The primary image and/or the secondary image may be modified or altered based upon various vehicle states, sensor signals, navigational information, results of image processing of video data received from cameras 62-68, or other data or information obtained by vehicle 12. Additionally, different types of vehicles may include cameras positioned at different areas in and/or around the vehicle. For example, a sedan may have auxiliary camera 68 positioned at an area in the backseat of the vehicle whereas a pick-up truck may have auxiliary camera 68 positioned at the area of a truck bed. Scenarios 100, 110, and 120 will be referred to below in facilitating discussion of the exemplary method 200, which is depicted in FIG. 5.

Figure 5:
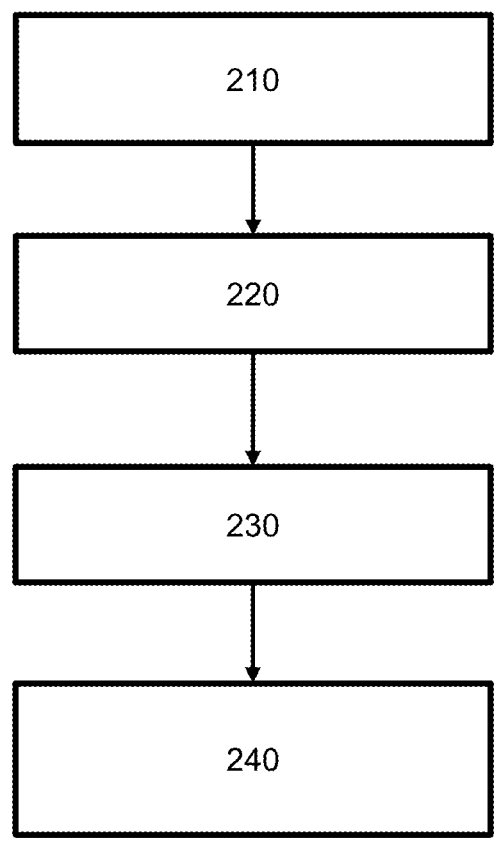
FIG. 5 is a flowchart of an exemplary method of displaying images on an electronic display included in a vehicle.

With reference to FIG. 5, there is shown an exemplary embodiment of a method 200 of displaying images on an electronic display mirror included in a vehicle. In some embodiments, the method 200 includes steps of receiving sensor signals from one or more sensors located on the vehicle, generating and displaying a primary image upon the electronic display mirror, and, then, based on the received sensor signals, generating and displaying the primary image and a secondary image or graphic on the electronic display mirror. The method 200 may be carried out by control unit 30 and/or any other suitable vehicle modules included in the vehicle 12, such as VSMs 42.

The method 200 begins with step 210, wherein a primary image 102 is generated that is to be displayed on the electronic display that is included in the vehicle, as shown in FIGS. 2-4. The primary image may be real-time or recorded video or an image from a frame of a video, such as an image generated from an interlaced scan type or progressive scan type video. Preferably, the primary image 102 is a rear-view of the area behind the vehicle 12 displayed on the electronic display mirror 28, which in the illustrated embodiment, shows the object 14 behind the vehicle 12. When the vehicle is placed in an on state such that the ignition or primary propulsion system is activated, the electronic display mirror 28 may display images received from rearview camera 62. The video data received may be flipped horizontally such that the image displayed functions similar to a traditional rearview mirror. In other embodiments, the primary image may be comprised of graphics, other images, or renderings. The method 200 continues to step 220.

In step 220, sensor signals are received from one or more sensors located on or at the vehicle 12. The one or more sensors may be vehicle sensors 26, cameras 62-68, V2V unit 24, GPS 22, an engine control unit, BCM 40, other VSMs 42 that obtain sensed input, microphone 56, pushbutton 52, as depicted in FIG. 1, or any other devices that may provide the vehicle with information pertaining to a vehicle state (e.g., operating states, other physical properties of the vehicle, vehicle module electronic or logical states), environmental conditions of the area around the vehicle, and/or external properties of the area surrounding the vehicle, such as the presence of other vehicles, pedestrians, electronic devices, or objects around or within the vehicle.

Additionally or alternatively, a vehicle status parameter may be monitored using one or more sensors included on or at the vehicle. The vehicle status parameter may be, or may be based on, one or more of a vehicle state, condition, and/or property of the vehicle and/or of the environment surrounding the vehicle. For example, the vehicle status parameter may include or be based on operating states, other physical properties of the vehicle (e.g., absolute speed of vehicle 12, position of the object 14 with respect to vehicle 12, location of the object 14 as depicted in the primary image, size of the object 14 with respect to the primary image, speed of object 14 with respect to the vehicle 12, and absolute speed of the object 14), vehicle module electronic or logical states, environmental conditions of the area around the vehicle, and/or external properties of the area surrounding the vehicle, such as the presence of other vehicles, pedestrians, electronic devices, or objects around or within the vehicle.

The received sensor signals and/or monitored vehicle status parameter may be stored in memory 36 of control unit 30, and/or may be processed by processor 34. As will be discussed more below (see step 240), the received sensor signals and/or monitored vehicle status may be used by the control unit to determine whether, where and/or how to display certain secondary images on electronic display mirror 28. In certain embodiments, step 210 may be carried out before step 220 and the generation of the primary image may be based on the received sensor signals and/or monitored vehicle status parameter. The method 200 proceeds to step 230.

In step 230, a secondary image 104 is generated as shown, for example in FIGS. 2-4, and, in some embodiments, the secondary image may be generated based on the monitored vehicle status and/or received sensor signals. The secondary image 104 may be an image similar to the primary image, but may be generated from video data received from a different camera. For example, the secondary image may be generated from video data received from auxiliary camera 68, which may include images of a truck bed of vehicle 12. In other embodiments, the secondary image may include a rendering using pre-stored graphic/image files (e.g., stored on memory 36), such as a rendering of an overhead view of vehicle 12, one or more graphics, or images obtained from one or more cameras in the vehicle. The rendering, as will be more detailed below, may be based on data received from one or more sensors, such as sensors 26 or cameras 62-68.

In some embodiments, numerous secondary images are generated. For example, a first secondary image may be generated to depict the area of a blind-spot on the left side of the vehicle and a second secondary image may be generated to depict the area of a blind-spot on the right side of the vehicle. Both of these secondary images may then be displayed at the same time on the electronic display mirror, as will be described below in step 240. In some embodiments, the vehicle may determine to display one or more secondary images based on the sensor signals received or the monitored vehicle status parameter.

In certain embodiments, a secondary image may not be generated depending on the monitored vehicle status parameter or based on the received sensor signals. For example, if a collision is likely with the object 14, the method may determine that only the primary image 102 should be displayed to provide a clearer or less obstructed picture to the driver. In such an embodiment, the method 200 may end or may proceed back to step 210 or 220. Otherwise, the method 200 may proceed to step 240.

In step 240, the primary image and the secondary image are displayed on the electronic display, wherein the secondary image is overlaid on the primary image in a position at least partially based on the received sensor signals. As used herein, "overlaid" may encompass blending the two images, placing one image in a designated subset of the available screen space and resizing the other image accordingly, putting one image on top of another image, or any other operable method of spatially including both images within a designated area, possibly blocking one or more portions of one or more images. In one embodiment, the primary image may encompass a substantial (or entire) portion of the electronic display mirror and the secondary image(s) may be placed on top of the primary image. In other embodiments, the primary image may encompass a certain designated or determined area of the electronic display. The designated area may be an area of the electronic display that is reserved for the primary image (e.g., a relatively large portion in the middle of the electronic display). The determined area may be an area of the electronic display that is determined to be the area on which the primary image is to be displayed and may be based on the monitored vehicle status parameter or received sensor signals.

For example, referring back to FIG. 2, the received sensor signals may detect or be used to detect that the other vehicle 14 is more to the left side of the primary image 102 than to the right side of the primary image 102. This may be determined based on image processing and object recognition techniques and/or may be based on other sensor signals, such as blind-spot detectors or vehicle information received via V2V unit 24. When other vehicle 14 is determined to be to the left side of vehicle 12 in an object area 106, the secondary image 104 may be overlaid in a position 108 on the right side of primary image 102 as to not interfere (or to reduce the interference) with the depiction of vehicle 14. Or, when both the vehicle 14 is determined to be to the left side of vehicle 12 and the vehicle 14 is depicted at least partially in the primary image 102, then the secondary image 104 may be overlaid on the right side of primary image 102. The same may be true for when other vehicle 14 is determined to be on the right and/or displayed at least partially on the right side of primary image 102, except that the secondary image 104 would be displayed in the position 108 which is now on the left side of electronic display mirror 28, as shown in FIG. 3. For example, if vehicle 14 crosses a halfway point, the secondary image 104 can be moved to the position 108 on the other side of the display 28. Further, the size of the secondary image 104 may correlate with the position 108 for the secondary image, which can be dependent on the object area 106. While FIGS. 2-4 show that the other vehicle 14 is crossing in an area behind the vehicle, oftentimes, there is another vehicle trailing the host vehicle, there is another object (e.g., pedestrian or the like), and/or there are one or more stationary objects. Any target object may impact the placement, size, qualities, etc. of the secondary image, depending on the desired implementation.

Additionally, or alternatively, one or more properties of the secondary image(s) may be altered based at least partially on the vehicle status parameter and/or received sensor signals. In some embodiments, this may allow a user to better discern certain aspects depicted in the primary image. For example, where the other vehicle or object 14 is displayed on the primary image 102 and the object area 106 take a substantial portion of the image 102, there may be no location to display the secondary image(s) without cutting off portions of the object 14. In such a case, where the object area 106 and the position 108 for the secondary image at least partially overlap, the secondary image 104 may be displayed, but the transparency of the secondary image may be adjusted (e.g., such that the secondary image is partially transparent), as is shown in FIG. 4. The adjustment of the transparency of the secondary image or other alteration of the secondary image may be based on the vehicle status parameter and/or the received sensor signals. For example, the transparency may be adjusted based on the relative speed of an object that is depicted in the primary image and/or the position of an object that is depicted in the primary image. To cite one example, if the object area 106 is 75% or more of the total screen area, the transparency level of the secondary image 104 may be adjusted to between 25% and 75%, or more particularly 50%. Or, if, for example, adjusting the size of the secondary image produces a secondary image that is too small (e.g., about 10% or less of the total area of the screen), then it may be more desirable to change the transparency level and keep the size of the image at a standard inset size. The altered properties of the secondary image may also include the position of the secondary image and/or the size of the secondary image. Other graphical and/or image alterations may be made, such as altering the size, hue, saturation, position, transparency, brightness, contrast, color, curves, tint, shade, tone, intensity, luminosity, shape, color sets or thresholds (e.g., black and white, grayscale, 8-bit color), posterization, color balance, exposure, levels, channels, and/or vibrance.

Other types of secondary images may be generated and/or obtained that can be displayed on electronic display mirror 28. For example, certain vehicle properties (e.g., absolute speed of vehicle 12, position of the object 14 with respect to vehicle 12, location of the object 14 as depicted in the primary image, size of the object 14 with respect to the primary image, speed of object 14 with respect to the vehicle 12, and absolute speed of the object 14) may be generated to be graphically displayed as a secondary image or as a part of the secondary and/or primary images. Additionally, other metrics or conditions may be generated and/or obtained to be displayed, such as environmental metrics (e.g., outside temperature, vehicle cabin temperature, predicted weather).

In other embodiments, there may be multiple secondary images displayed on the electronic display mirror at the same time. One or more of these secondary images may be overlaid on top of the primary image (e.g., Picture-in-Picture (PIP)). In one embodiment, the electronic display may be divided down the middle (e.g., a 50/50 split that creates a left side and a right side with the same area). The primary image may then be displayed on the left side and the secondary image may then be displayed on the right side. The electronic display may be split in different proportions, such as 60/40 for primary image/secondary image or 20/60/20 for first secondary image/primary image/second secondary image. In one embodiment, the primary image may be an image from rearview camera 62, the first secondary image may be an image from left blind-spot camera 64, and the second secondary image may be an image from right blind-spot camera 66. The first and/or second secondary images may be removed and the space may be reorganized in accordance therewith when no objects (such as vehicle 14) are detected to be in the left and/or right blind-spots of vehicle 12 and/or otherwise in the primary image.

The primary and secondary image(s) may then be displayed on electronic display mirror 28. A final image which is a composite of the primary and secondary image(s) may be generated by control unit 30 and then sent to electronic display mirror 28 via bus 44. The final image may be a single aggregated image that is generated based on the determinations made above regarding the properties, size, positioning, and/or other display attributes of the primary and secondary image(s). Once the final image is received, the electronic display mirror 28 then displays the final image. The electronic display mirror may display other textual or graphical information on the final image. Alternatively or additionally, the electronic display mirror may display the final image in accordance with other metadata received along with the final image or in accordance with other instructions received at electronic display mirror 28. The method 200 then ends.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation. In addition, the term "and/or" is to be construed as an inclusive or. Put differently, the phrase "A, B, and/or C" includes: "A"; "B"; "C"; "A and B"; "A and C"; "B and C"; and "A, B, and C."

The invention claimed is:

1. A method of displaying images on an electronic display included in a vehicle, the method comprising:
generating a primary image to display on the electronic display that is included in the vehicle;
receiving sensor signals from one or more sensors located on or at the vehicle;
based on the sensor signals, determining whether an object is located within a left-side area corresponding to a left-side portion of the primary image or within a right-side area corresponding to a right-side portion of the primary image;

generating a secondary image to display on the electronic display; and displaying the primary image on the electronic display and the secondary image on the electronic display, wherein the secondary image is overlaid on the primary image in a position at least partially based on the received sensor signals, and wherein:

when the object is located within the left-side area, the secondary image is overlaid on the right-side portion of the primary image, and when the object is located within the right-side area, the secondary image is overlaid on the left-side portion of the primary image.

2. The method of claim 1, wherein the primary image is generated from a rear-facing camera and the electronic display is an electronic display mirror.

3. The method of claim 1, wherein at least one of the primary image or the secondary image is a part of a streaming video feed.

4. The method of claim 1, further comprising the step of detecting that an object is depicted in the primary image using the received sensor signals, and, based on the detection, determining a location on the primary image on which to overlay the secondary image.

5. The method of claim 4, wherein the detecting step further includes determining an area on the primary image where the object is depicted, and wherein the location on the primary image on which to overlay the secondary image is based on the area on the primary image where the object is detected.

6. The method of claim 5, wherein the location on the primary image on which to overlay the secondary image and the area on the primary image where the object is depicted are wholly separate from one another.

7. The method of claim 1, wherein the secondary image is generated from a camera facing one or more of the following areas: a back seat of the vehicle, a truck bed of the vehicle, a blind spot of the vehicle, an inside area of a trunk, or an inside area of a trailer.

8. The method of claim 1, further comprising the step of generating one or more additional secondary images to display on the electronic display and overlaying the one or more additional secondary images on the primary image in a position at least partially based on the received sensor signals.

9. A system for displaying images in a vehicle, the system comprising:

one or more sensors located on or at the vehicle;

a rear-facing camera configured to generate a primary image;

a second camera configured to generate a secondary image;

an electronic display mirror configured to display the primary image from the rear-facing camera and the secondary image from the second camera; and a control unit connected to the one or more sensors, the rear-facing camera, the second camera, and the electronic display mirror, wherein the control unit is configured to:

receive sensor signals from the one or more sensors located on or at the vehicle;

based on the sensor signals, determining whether an object is located within a left-side area corresponding to a left-side portion of the primary image or within a right-side area corresponding to a right-side portion of the primary image; and display the primary image on the electronic display mirror and the secondary image on the electronic display mirror, wherein the secondary image is overlaid on the primary image in a position at least partially based on the received sensor signals, and wherein: when the object is located within the left-side area, the secondary image is overlaid on the right-side portion of the primary image, and when the object is located within the right-side area, the secondary image is overlaid on the left-side portion of the primary image.

10. The system of claim 9, wherein the second camera is a truck-bed camera.

* * * * *